T. J. MOSURE.
TIME CONTROLLED ADVERTISING DEVICE.
APPLICATION FILED NOV. 29, 1919.
1,384,479.
Patented July 12, 1921.
2 SHEETS—SHEET 1.
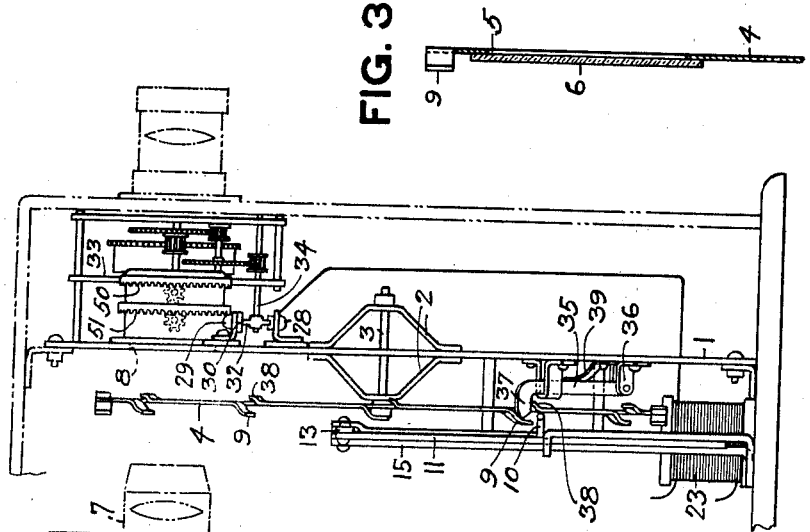
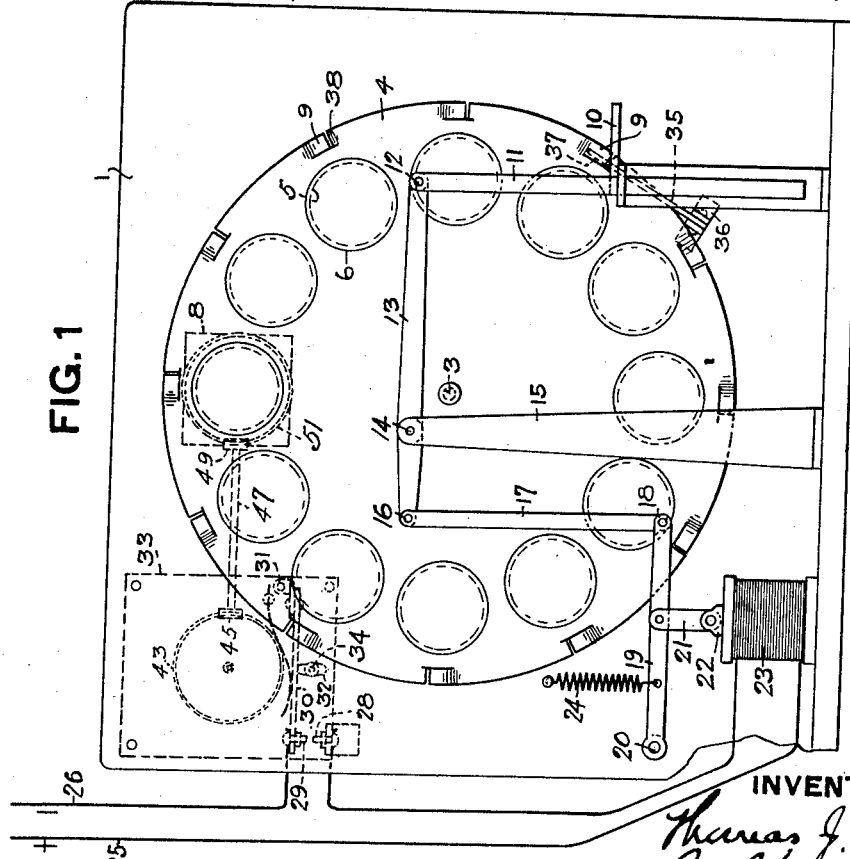
INVENTOR T. J. MOSURE.
TIME CONTROLLED ADVERTISING DEVICE.
APPLICATION FILED NOV. 29, 1919.

1,384,479.

Patented July 12, 1921.
2 SHEETS—SHEET 2.

INVENTOR

UNITED STATES PATENT OFFICE.

THOMAS J. MOSURE, OF NILES, OHIO.

TIME-CONTROLLED ADVERTISING DEVICE.

1,384,479.  Specification of Letters Patent.  Patented July 12, 1921.

Application filed November 29, 1919. Serial No. 341,505.

*To all whom it may concern:*

Be it known that I, THOMAS J. MOSURE, a citizen of the United States, and resident of Niles, in the county of Trumbull and State of Ohio, have invented a new and useful Improvement in Time-Controlled Advertising Devices; and I do hereby declare the following to be a full, clear, and exact description thereof.

My invention relates to electric advertising devices and it has for its object to provide an improved compact and simple apparatus for projecting a considerable number of advertising legends or pictures upon a screen, the pictures being changed at predetermined intervals by electrically-operated and time-controlled means.

Broadly stated, my invention comprises a rotatable disk having openings near its periphery in which advertising pictures may be supported, together with a light source for projecting light through one of these openings, or for otherwise illuminating the pictures in succession, an electrically-operated mechanism for imparting a step-by-step rotation to the disk and a clock-work device for energizing the electric operating means at predetermined and variable intervals. An additional feature of my invention consists in providing means for superposing on the image of each picture as it is projected on the screen the image of a clock-face, in order that the spectator who sees the advertising picture may also tell the time.

Figure 7:
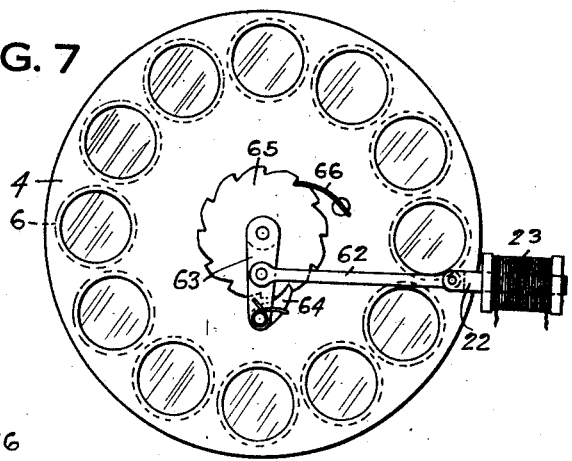
Figure 6:
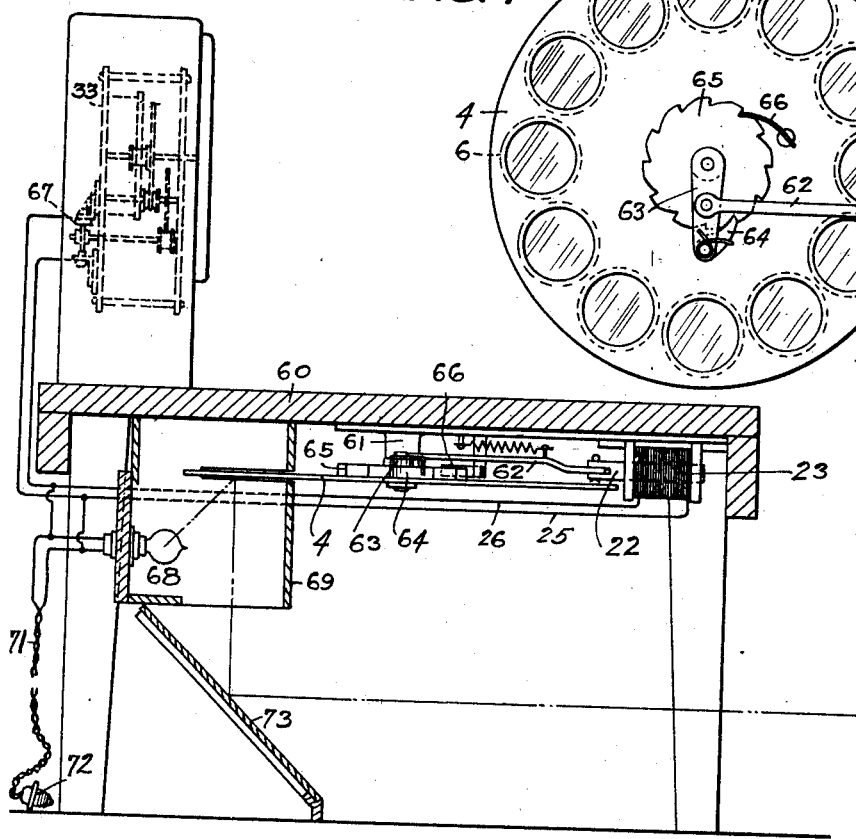
Figure 4:
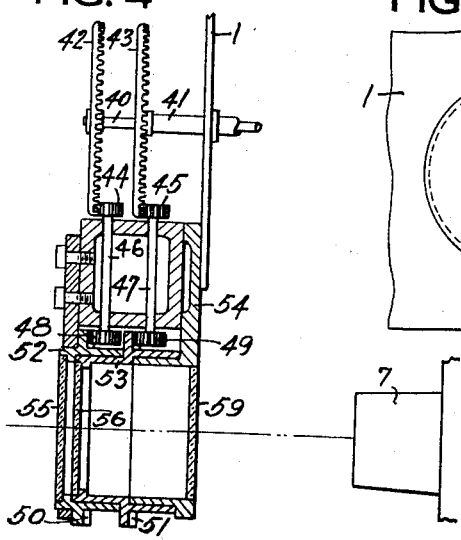
Figure 5:
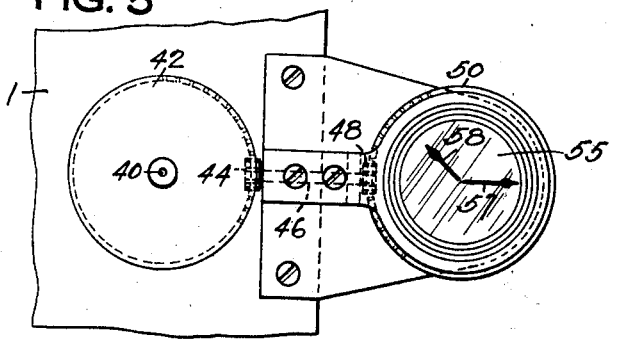

Two embodiments of my invention are illustrated in the accompanying drawings, in which Figure 1 is a side elevational view of an advertising device constructed in accordance with my invention, the light-projecting apparatus being shown diagrammatically; Fig. 2 is an end elevational view of the same structure; Fig. 3 is a detail sectional view of a portion of the picture-carrying disk; Fig. 4 is a plan view, with parts in section, of one means for projecting a clock-face along with the advertising pictures; Fig. 5 is a front elevational view of the structure of Fig. 4; Fig. 6 is an end view, partly in elevation and partly in section, showing my device applied to a modified system of projection; Fig. 7 is a diagrammatic plan view showing one means for rotating the disk in the device of Fig. 6.

In moving picture theaters and other places of assembly it is frequently desired to throw upon the wall or upon an auxiliary screen a series of advertising devices; and various means have been used for this purpose, such means usually consisting of a disk rotated by clock-work and carrying a series of transparent advertising pictures successively into proper relation with a light projector. Such devices are sufficient when it is desired to change the pictures at intervals of one minute or half a minute, but when more frequent changes are desired, it has been found that the clock-work device cannot be employed.

Clock-work devices have the further objection that the tension placed upon the spring in rotating the advertising disk is so great that the clock-work cannot be relied upon to operate a time-indicating clock. This objection is especially material if it is desired to project along with the advertising pictures the image of a clock-face, in order that the pictures which appear upon the screen may serve the double purpose of a clock and an advertisement.

According to my present invention, I provide a device of the general class described, but having electrically operated means for imparting a step-by-step rotation to the disk, and also having a time-controlled arrangement by which the electric means may be energized at any desired intervals, no matter how short such intervals may be.

Other improvements and advantages will appear in connection with the detailed description of the drawings, Figs. 1 to 5 of which show a device adapted for the projection of advertisements, together with a time-indicating clock-face, upon a distant screen, as, for example, in a moving picture theater; while Figs. 6 and 7 illustrate a modified form of device adapted for use in show windows and the like.

Referring to Figs. 1 to 5, the apparatus therein shown comprises a vertical supporting plate 1 mounted in an inclosing box or in any other suitable way and carrying brackets 2 in which is mounted a shaft 3 that carries a circular disk 4. The disk 4 is provided with a series of twelve openings 5 and with suitable clips or other attaching devices for removably holding transparent advertising plates 6 in front of the openings 5. A suitable light projector 7, indicated diagrammatically in Fig. 2, is adapted to throw a beam of light through an opening 8 in the stationary plate 1, and through the opening 5 in the rotary plate 4 which at any given time is in the uppermost position. The number of openings 5 may of course be varied as desired.

The rotary disk 4 is given a step-by-step rotation at predetermined intervals, and for this purpose is provided with twelve peripheral ratchet teeth 9 which as shown are struck up laterally from the plate at its periphery. A ratchet member 10 coöperates with the teeth 9 to rotate the disk and is carried by a swinging arm 11 which is pivotally attached at 12 to a lever 13 which is pivoted at 14 upon a standard 15. To the end of the lever 13 opposite to the swinging arm 11 is pivoted at 16 a link 17, the lower end 18 of which is pivoted to an operating lever 19, which in turn is pivoted at 20 to the supporting plate 1 and is connected by means of a link 21 to the armature 22 of a solenoid 23. A spring 24 tends to draw the lever 19 upwardly in opposition to the pull of the armature 22.

The winding of the solenoid 23 is connected by means of lead-wires 25 and 26 to a suitable source of electric energy, not shown, which may conveniently be an ordinary electric lighting circuit, in which case the lead-wires 25 and 26 are connected to a suitable plug connector. Interposed in the lead-wire 26 is a contact-making device for making and breaking the circuit through the solenoid 23, such device, as shown, consisting of a stationary contact member 28 and a movable contact member 29 which coöperates with the stationary contact member 28 and which is mounted upon a bar 30 of insulating material pivoted to the supporting plate 1 at 31 and given an up and down oscillating movement by means of a cam 32. As shown, the cam 32 is provided with two projections or risers, but this cam may obviously be provided with three, four or even a larger number of projections, in which case the movable contact member 29 is given a corresponding number of oscillations during each complete rotation of the cam 32.

In order to rotate the cam 32, and also in order to operate the time-indicating mechanism described below, I provide a clock mechanism designated generally by the numeral 33. This clock mechanism may be of any ordinary form, and the cam 32 may suitably be attached to a shaft 34 integral with, or secured to rotate with, the second wheel of the clock so that the cam 32 is given a complete rotation once in each minute.

The position of the rotary disk 4 after each of its step-by-step movements is regulated by means of a holding pawl 35 which, as shown, is pivotally attached to a bracket 36 secured to the supporting plate 1. The pawl 35 has a lateral projection 37 which is adapted to engage ratchet teeth 38 formed in the disk 4 adjacent to the ratchet teeth 9, and the projection 37 of the holding pawl is so curved that, when the actuating pawl 10 rises to rotate the disk, the holding pawl will be thrust aside and the disk permitted to move. A spring 39 bears upon the holding pawl 35 to force the projection 37 toward the disk 4.

In the operation of the device, as thus far described, the lead-wires 25 and 26 are attached to a source of electric energy, suitably by means of a connecting plug as indicated above, and the clock 33 is set in motion. As the shaft 34 rotates, the cam 32 causes the movable contact member 29 to rise and fall and if the cam has two projections, as shown, the contact members are brought together once every thirty seconds, thus completing the circuit through the solenoid 23, drawing down the armature 22 and thereby raising the actuating pawl 10 and rotating the disk to bring the next advertising picture into proper relation with the light projector 7. This operation is repeated as long as electric energy is supplied and the clock kept in motion, the disk being moved at any selected time-interval in accordance with the number of cam-projections that are provided.

The apparatus may be used as described without additional parts, but I prefer to provide also means for simultaneously projecting a time-indicating clock-face along with the advertising pictures. I also prefer that this time-indicating device be of such a nature that the image of the hands of the clock be projected upon the image of the advertisement in such a way that the hands will have no visible support in order that curiosity may be aroused in the minds of the spectators as to how the hands are moved.

To these ends, I may provide two parallel supports of glass or other transparent material, one support carrying a minute hand and the other an hour hand, and both of the supports being rotated synchronously with the minute and hour pinions of the clock 33.

One method of arranging this time-indicating device is best shown, somewhat diagrammatically, in Figs. 4 and 5 of the drawing, where the concentric minute-hand shaft and hour-hand shaft of the clock 33 are indicated at 40 and 41. Instead of the usual hands, these shafts carry crown gears 42 and 43, respectively, meshing with pinions 44 and 45 that are secured to shafts 46 and 47 mounted in suitable supports on the plate 1. To the opposite ends of the shafts 46 and 47 are attached pinions 48 and 49 which mesh with crown gears 50 and 51 that are mounted upon rings or barrels 52 and 53, respectively, these barrels being rotatably mounted in suitable supports 54. The light projector 7 is adapted to project a beam of light through the concentric barrels 52 and 53 and also, as in Fig. 2, through the advertising devices carried by the disk 4, the disk 4 being omitted from Fig. 6 for the sake of clearness. To the forward ends of the barrels 52 and 53 are secured glass disks 55 and 56, respectively, the disk 55 carrying a minute hand 57 and the disk 56 carrying an hour hand 58. A series of clock-face numerals may be inscribed upon each of the advertising devices carried by the disk 4, or, if desired, a single series of clock-face numerals may be employed and may be carried by a stationary glass disk 59 mounted co-axially with the disks 55 and 56.

It will be readily seen that when the device of Figs. 4 and 5 is applied to that of Figs. 1 and 2, the image of the moving hands 57 and 58 will be projected upon a screen along with the advertising pictures, and that no support for the hands will be visible to the spectators.

In the modified form of device shown in Figs. 6 and 7, the clock 33 and the advertising disk 4 are mounted upon a small table 60 which is adapted to be placed in a show window or other convenient place, the clock 33 in this modification being provided with its ordinary hands and dial and the disk 4 being suspended from a bracket 61 secured beneath the table 60. In this form of device the solenoid 23 is connected to rotate the disk 4 by means of a link 62 pivotally attached to the armature 22 of the solenoid and also pivoted to a lever 63 which is mounted co-axially with the disk 4 and which carries a spring-pressed pawl 64 engaging the teeth of a ratchet disk 65 that is secured to the disk 4. A holding pawl 66 is provided to prevent reverse motion of the disk 4.

The lead-wires 25 and 26 of the solenoid 23 are connected to a contact-making device 67 which may be similar in all respects to the contact-making device described in connection with the apparatus of Figs. 1 and 2, the lead-wires being connected across the circuit of an incandescent lamp 68 or other suitable source of light, which, as shown, is inclosed within a box 69 secured beneath the table 60. The box 69 serves as a screen to prevent the lamp 68 from being directly visible from the front of the table. Electric energy for the lamp 68 and the solenoid 23 is supplied through a cord 71 and the plug 72. A mirror 73 is disposed below the advertising disk 4 and the advertising pictures are thrown upon the mirror by means of the reflected light from the lamp 68. In this form of my device, the pictures need not be transparent, but may be ordinary printed or lithographed cards or slips of paper. The greater part of the table 60 is left free to support any desired articles.

The operation of the device shown in Figs. 6 and 7 is similar to the operation of the device of Figs. 1 and 2, the disk 4 being moved at any desired time interval in accordance with the number of projections upon the cam which operates the contact device 67. It is obvious that numerous modifications may be made in the construction and arrangement of the parts which I have herein shown and described, and I therefore desire that no limitations be imposed upon my invention except such as are indicated in the appended claims.

I claim as my invention:

1. In an advertising device, the combination of a light source, a rotatable disk provided with means for carrying a series of advertisements, electrically operable means for imparting a step-by-step rotation to the said disk and time-controlled means for energizing the said rotating means, the said time-controlled means comprising a clock, a fixed contact member associated with the said clock and insulated therefrom, a movable contact member adapted to coöperate with the said fixed contact member, and a cam operating the said movable member, the said cam being connected to rotate with one of the rotary parts of the said clock.

2. In an advertising device, the combination of a rotatable disk provided with means for carrying a series of advertisements, of means for imparting a step-by-step rotation to the said disk, the said rotating means comprising a set of ratchet teeth associated with the said disk and a pawl coöperating with the said ratchet teeth, electrically operating means for moving said pawl, and a circuit controlling device comprising a fixed contact member, a movable contact member, and a time-controlled cam adapted to bring the said movable contact member into engagement with the said fixed contact member at pre-determined and variable time intervals.

3. In an advertising device, the combination of a supporting table or the like, a disk supported to rotate in a vertical axis beneath the said table and provided with means for carrying a series of advertisements, means for imparting a step-by-step rotation to the said disk and an image-receiving member disposed beneath the said table and adapted to receive the images of the advertisements carried by the said disk.

4. In an advertising device, the combination of a supporting table or the like, a rotatable disk secured beneath the said table and provided with means for carrying a series of advertisements, a clock supported upon said table, electrically operable means controlled by the said clock for imparting a step-by-step rotation to the said disk, a mirror disposed beneath the said table, and a light source adapted to project images of the said advertisements upon the said mirror.

5. In an advertising device, the combination of a supporting table, a clock mounted at one side of the table and facing the other side, a disk supported to rotate on a vertical axis beneath the said table and provided with means for carrying a series of advertisements, electrically operable means controlled by the said clock for imparting a step-by-step rotation to the said disk, a mirror angularly disposed beneath the said table and a light source adapted to project reflected images of the said advertisements on the mirror.

6. In an advertising device, the combination of a table supported on suitable legs and having a substantially unobstructed space between the front legs thereof, a clock disposed at the rear of the table and facing the front of the table, a disk supported to rotate on a vertical axis beneath the said table and provided with means for carrying a series of advertisements, means controlled by the said clock for imparting a step-by-step rotation to the said disk, a mirror set at an angle of substantially 45° beneath the rear edge of the said disk, a light source adapted to project reflections of the said advertisements upon the said mirror, and a screen for hiding the said light source from direct view from the front of the said table.

In testimony whereof, I the said Thomas J. Mosure, have hereunto set my hand.

THOMAS J. MOSURE.

Witnesses:
    Chas. Waldinger,
    H. E. Nair.